US010127506B2

(12) United States Patent
Anbil Parthipan et al.

(10) Patent No.: US 10,127,506 B2
(45) Date of Patent: Nov. 13, 2018

(54) DETERMINING USERS FOR LIMITED PRODUCT DEPLOYMENT BASED ON REVIEW HISTORIES

(71) Applicant: International Business Machines Corporation, Armonk, NY (US)

(72) Inventors: Sarath Chandar Anbil Parthipan, Tamilnadu (IN); Vijay Ekambaram, Tamilnadu (IN); Ashok Gautham Jadatharan, Tamilnadu (IN)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 14/820,759

(22) Filed: Aug. 7, 2015

(65) Prior Publication Data

US 2017/0039507 A1   Feb. 9, 2017

(51) Int. Cl.
| | |
|---|---|
| *G06Q 10/06* | (2012.01) |
| *G06F 8/60* | (2018.01) |
| *G06F 8/70* | (2018.01) |
| *G06F 17/30* | (2006.01) |

(52) U.S. Cl.
CPC ....... *G06Q 10/063118* (2013.01); *G06F 8/60* (2013.01); *G06F 8/70* (2013.01); *G06F 17/3053* (2013.01); *G06Q 10/06398* (2013.01); *G06Q 10/063112* (2013.01)

(58) Field of Classification Search
CPC ......... G06Q 10/00; G06Q 40/00; G06F 17/60
USPC ...................................................... 705/7.29
See application file for complete search history.

(56) References Cited

U.S. PATENT DOCUMENTS

| | | | |
|---|---|---|---|
| 8,108,255 B1 | 1/2012 | Robinson et al. | |
| 8,380,694 B2 | 2/2013 | Ruhl et al. | |
| 8,578,501 B1 | 11/2013 | Ogilvie | |
| 2003/0217333 A1* | 11/2003 | Smith | G06F 9/542 715/234 |
| 2008/0275980 A1* | 11/2008 | Hansen | G06Q 30/02 709/224 |

(Continued)

FOREIGN PATENT DOCUMENTS

WO    WO-2006088546 A2 *   8/2006   .............. G06Q 30/02

OTHER PUBLICATIONS

Chavanu, How to Become an Amazon Vine Reviewer & Get Free Stuff, http://www.makeuseof.com/tag/amazon-vine-reviewer-free-stuff/, Aug. 4, 2010.

*Primary Examiner* — Romain Jeanty
(74) *Attorney, Agent, or Firm* — Ryan, Mason & Lewis, LLP

(57) ABSTRACT

Methods, systems, and computer program products for determining users for limited product deployment based on review histories are provided herein. A method includes accessing a collection of reviews generated by a plurality of users and pertaining to multiple features of multiple products; computing multiple qualitative measures for each respective one of the plurality of users based on analysis of the collection of reviews; and outputting, to a sub-set of the plurality of users, (i) a deployment of a given product comprising a new feature of the given product and/or a modified feature of the given product and (ii) a query for a review of the new feature of the given product and/or the modified feature of the given product, wherein the sub-set of the plurality of users is selected based on said computed multiple qualitative measures.

18 Claims, 4 Drawing Sheets

(56) References Cited

U.S. PATENT DOCUMENTS

| | | | |
|---|---|---|---|
| 2009/0138427 A1* | 5/2009 | Kalavade | G06Q 10/0637 |
| 2010/0037209 A1* | 2/2010 | Sasaki | G06F 11/3604 |
| | | | 717/123 |
| 2011/0173191 A1* | 7/2011 | Tsaparas | G06F 17/30616 |
| | | | 707/723 |
| 2013/0066800 A1 | 3/2013 | Falcone et al. | |
| 2013/0144802 A1 | 6/2013 | Bank et al. | |
| 2013/0173491 A1 | 7/2013 | Nations et al. | |
| 2013/0231989 A1 | 9/2013 | Abu Ayyash | |
| 2013/0275554 A1 | 10/2013 | Smith | |
| 2014/0019228 A1 | 1/2014 | Aggarwal et al. | |
| 2015/0012838 A1 | 1/2015 | Hegstad et al. | |

\* cited by examiner

DETERMINING USERS FOR LIMITED PRODUCT DEPLOYMENT BASED ON REVIEW HISTORIES

FIELD

The present application generally relates to information technology, and, more particularly, to software development.

BACKGROUND

Traditional software deployment generally includes the following sequence: (i) ideation of a software product including one or more features, (ii) development of the one or more features, (iii) testing of each of the one or more features, (iv) carrying out a feature freeze, (v) testing the software product, and (vi) executing a release of the software product. Alternate deployment techniques (also referred to herein as agile software deployment) include carrying out ideation, development, testing, and deployment for each respective one of multiple features independently.

Additionally, such software deployment practices can be supplemented with a preliminary release of a given feature to a small set (or sub-set) of users to evaluate the real-world impact of the given feature. Such a preliminary release is also referred to herein as a "dark launch." However, dark launches face challenges, for example, in selecting appropriate and/or productive users. Certain users may not provide useful feedback, and may even provide inaccurate and/or harmful feedback, which may cause future users to forego usage of the product in question.

SUMMARY

In one aspect of the present invention, techniques for determining users for limited product deployment based on review histories are provided. An exemplary computer-implemented method can include steps of accessing a collection of reviews generated by a plurality of users and pertaining to multiple features of multiple products, wherein said accessing comprises communicating with a server on which the collection of reviews is maintained; computing multiple qualitative measures for each respective one of the plurality of users based on analysis of the collection of reviews, wherein said computing is carried out by a user scoring module executing on a hardware processor that is communicatively linked to (i) the server and (ii) a plurality of devices operated by the users; and outputting, to a sub-set of the plurality of users, (i) a deployment of a given product comprising a new feature of the given product and/or a modified feature of the given product and (ii) a query for a review of the new feature of the given product and/or the modified feature of the given product, wherein the sub-set of the plurality of users is selected based on said computed multiple qualitative measures, and wherein said outputting is carried out by the user scoring module communicating to a sub-set of the plurality of devices that correspond to the sub-set of the plurality of users.

In another aspect of the invention, an exemplary computer-implemented method can include steps of accessing a collection of reviews generated by a plurality of users and pertaining to multiple features of multiple products, wherein said accessing comprises communicating with a server on which the collection of reviews is maintained; computing multiple qualitative measures for each respective one of the plurality of users based on analysis of the collection of reviews, wherein said computing is carried out by a user scoring module executing on a hardware processor that is communicatively linked to (i) the server and (ii) a plurality of devices operated by the users; and combining the multiple qualitative measures to generate an overall score for each respective one of the plurality of users, wherein said computing is carried out by the user scoring module executing on the hardware processor. Such a method also includes ranking the plurality of users on a basis of the overall score for each respective one of the plurality of users, wherein said ranking is carried out by the user scoring module executing on the hardware processor; and outputting, to a predetermined number of the plurality of users based on said ranking, (i) a deployment of a given product comprising a new feature of the given product and/or a modified feature of the given product and (ii) a query for a review of the new feature of the given product and/or the modified feature of the given product, wherein said outputting is carried out by the user scoring module communicating to a predetermined number of the plurality of devices that correspond to the predetermined number of the plurality of users.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes determining users for limited product deployment (also referred to herein as a dark launch) based on review histories. Benefits of dark launching include, for example, enlisting real users to help uncover previously undetected bugs. As a result of such outcomes, bad or undesirable features can be retracted without affecting most users (and/or future users). Also, user feedback earlier in the development cycle facilitates evolution of features that are liked and/or desirable by users. Further, productive dark launching also allows choosing between alternatives by releasing such alternatives to different subsets of users and analyzing resultant behavior and/or responses pertaining to each alternative.

Accordingly, at least one embodiment of the invention includes determining and/or identifying specific users who actively provide reviews on various software applications and/or products, and subsequently (and in a targeted manner) providing (via a dark launch, for example) one or more new features (of a given software application and/or product) to the identified users to test or evaluate the real-world impact of the one or more new features. As detailed herein, potential users are identified for a dark launch by analyzing application reviews and ranking a set of users based on the analyzed reviews with respect to aspects such as loyalty, informative content, timing and frequency of feedback, feature-specific reviews and review history.

Figure 1:
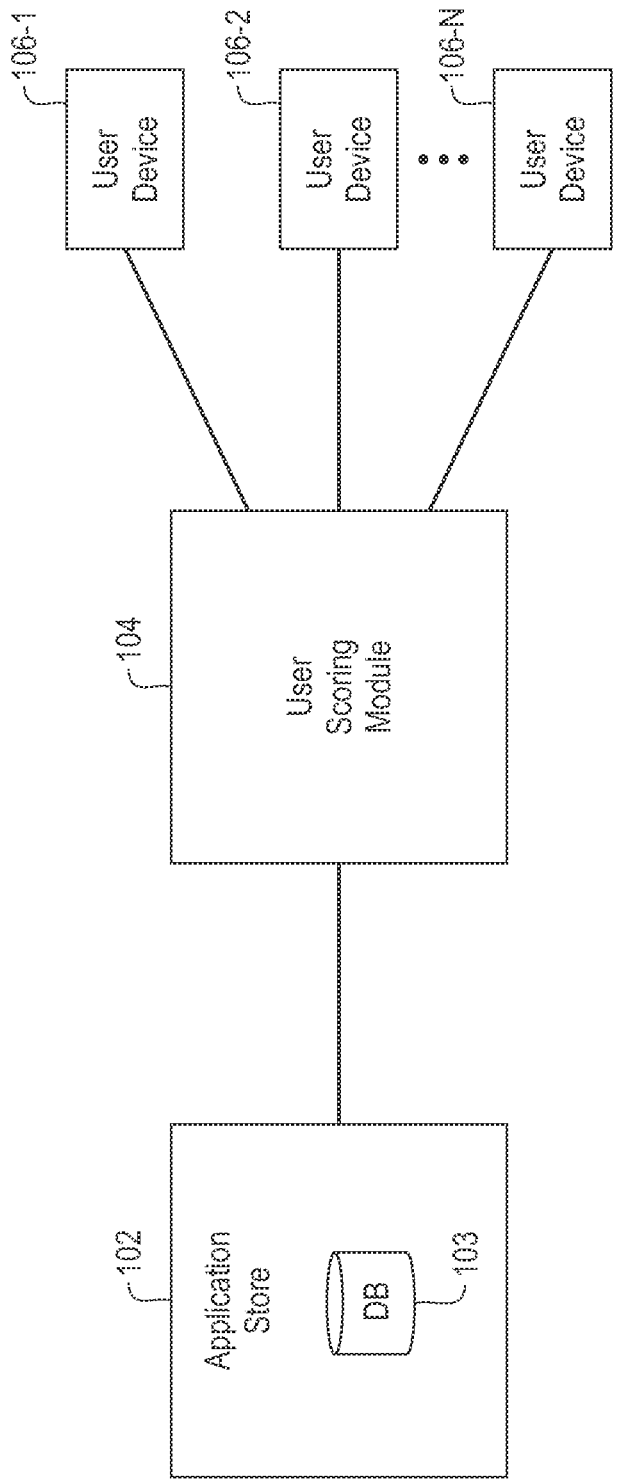
FIG. 1 is a diagram illustrating system architecture, according to an example embodiment of the invention.
Figure 2:
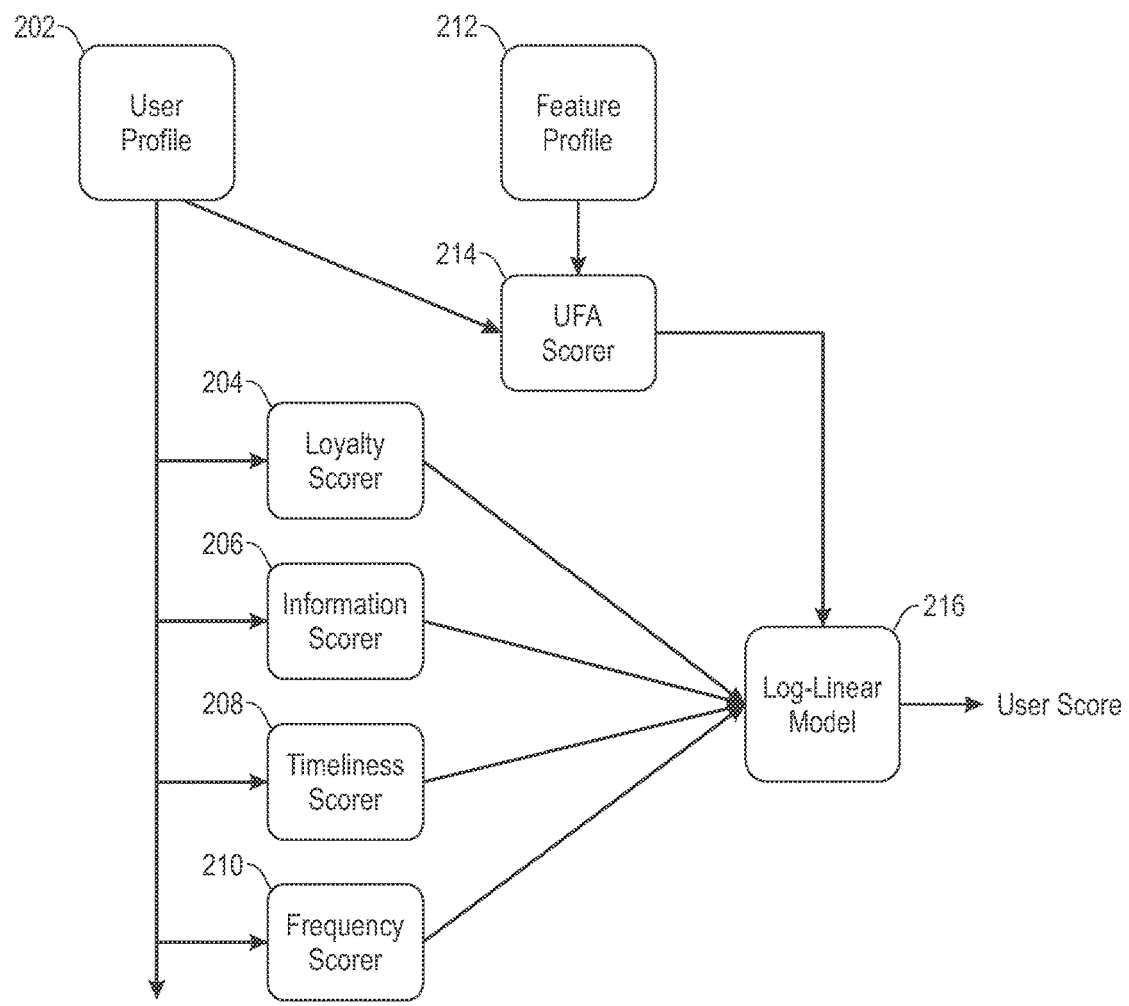
FIG. 2 is a diagram illustrating system architecture, according to an example embodiment of the invention.

FIG. 1 is a diagram illustrating system architecture, according to an embodiment of the invention. By way of illustration, FIG. 1 depicts a system wherein potential and/or suitable candidates for dark launches are identified based on review history derived from an application (app) store. Specifically, FIG. 1 depicts an application store 102, which includes a database 103 storing a collection of application reviews generated and/or provided by a plurality of users. Additionally, FIG. 1 depicts a user scoring module 104 (the sub-components of which are illustrated in FIG. 2), which is linked to the application store 102 as well as to user devices 106-1 through 106-N (hereinafter, collectively referred to as user devices 106).

The user devices 106 may represent portable devices, such as mobile telephones, personal digital assistants (PDAs), wireless email devices, game consoles, etc., or combinations thereof. The user devices 106 may alternatively represent desktops or laptop personal computers (PCs), microcomputers, workstations, mainframe computers, wired telephones, television set top boxes, or combinations thereof. The user devices 106 may also be referred to herein as simply "users." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device.

Accordingly, as illustrated in FIG. 1, the user scoring module 104 captures reviews from the application store 102 (stored in database 103, for example), analyzes the captured reviews to identify (ideal) candidates for a given dark launch such that a particular new product and/or new feature(s) can be released to the identified users for evaluation.

It is to be appreciated that a given embodiment of the disclosed system may include multiple instances of the application store 102 and the user scoring module 104, and possibly other system components, although only single instances of such components are shown in the simplified system diagram of FIG. 1 for clarity of illustration. Additionally, the user scoring module can be connected to the application store 102 and/or the user devices 106 over one or more networks via a wired and/or wireless connection. Such a network may comprise, for example, a global computer network such as the Internet, a wide area network (WAN), a local area network (LAN), a satellite network, a telephone or cable network, or various portions or combinations of these and other types of networks.

FIG. 2 is a diagram illustrating system architecture, according to an embodiment of the invention. By way of illustration, FIG. 2 depicts the user scoring module 104 (as shown in FIG. 1), which can be implemented for scoring a user for a specific feature launch. Specifically, FIG. 2 depicts a user profile 202 and a feature profile 212, which are used to compute various features or sub-scores that are ultimately utilized and/or combined to calculate a user score for a particular user with respect to a particular feature. In at least one embodiment of the invention, a user profile is modelled based on information pertaining to user characteristics such as, for example, loyalty, informative, timeliness, and frequency score. Additionally, in such an embodiment, a feature profile is based on, for example, a user-feature alignment (UFA) score, such as described further herein.

In connection with (and based on input received from) the user profile 202, a loyalty scorer component 204 computes a loyalty score (f1) for a given user (whose profile information is maintained within component 202), a frequency scorer component 210 computes a frequency score (f2) for the given user, a timeliness scorer component 208 computes a timeliness score (f3) for the given user, and an informative scorer component 206 computes an informativeness score (f4) for the given user. Additionally, in connection with (and based on input received from) the feature profile 212 as well as the user profile 202, UFA scorer component 214 computes a UFA score (f5) for the given user and the given feature.

Accordingly, at least one embodiment of the invention (such as one implemented by a user scoring module 104 that is further illustrated in FIG. 2) includes analyzing reviews and feature information to identify a sub-set of users well-suited for dark-launches of new application features using a combination of the following objectives: identifying users who are likely to provide informative feedback rather than emotional feedback (quantified via the above-noted informativeness score (f4)); identifying users who are likely to continue using the product and/or application even when faced with temporary inconveniences (quantified via the above-noted loyalty score (f1)); identifying users who are likely to provide prompt and/or early-stage feedback (quantified via the above-noted timeliness score (f3)); identifying users who would be most aligned with the new/particular feature being launched based on user review histories and the product or application's feature launch history (quantified via the above-noted UFA score (f5)); and identifying users who spend considerable time and/or who explore and review many features in applications, as such users can be more likely to uncover bugs and/or issues (quantified via the above-noted frequency score (f2)). One or more embodiments of the invention includes sub-setting a collection of users based on a metric that is a function of all of the above quantifications and the feature being dark-launched.

Referring back to FIG. 2, the loyalty scorer component 204 generates an output of a loyalty score (f1) for a given user by implementing a metric that is based on (i) the length of time for which the given user has used the application or product (which includes non-application store data), and (ii) fluctuations in the rating provided by the given user for various applications or products. In at least one embodiment of the invention, individual applications provide an option to provide user reviews and feedback (that is, a user does not have to go to an app store to post reviews). In at least one embodiment of the invention, $(f1)=w_1*(\text{time spent in the app})+w_2*(\text{var(ratings)})$, wherein $w_1$ and $w_2$ are respective weights for the two noted variables, and wherein var(ratings) is the variance in the ratings provided by the given user for various applications.

Additionally, the frequency scorer component 210 generates an output of a frequency score (f2) for a given user by implementing a metric that is based on (i) a count of reviews generated by the given user, and (ii) review date/time of the reviews generated by the given user. In one or more embodiments of the invention, users who have generated reviews recently are more suited for a dark launch than users who have not generated reviews recently. Accordingly, in at least one embodiment of the invention, (f2)=$w_3$*(discounted review count), wherein $w_3$ is the weight applied to the noted variable (discounted review count) of the total count of the reviews generated by the given user discounted by the time that the reviews were generated by the given user. As noted, in one or more embodiments of the invention, more recent reviews will be more highly weighted than older (or less recent) reviews.

The timeliness scorer component 208 generates an output of a timeliness score (f3) for a given user. Quick and/or prompt feedback is commonly important for dark launches. Accordingly, in one or more embodiments of the invention, users who provide reviews as soon as he or she encounter new features are more suited for a dark launch than users who take more time to provide feedback. As such, the timeliness scorer component 208 generates the timeliness score (f3) for a given user by implementing a metric that is based on (i) dates/times of previous reviews generated by the given user, and (ii) dates/times of launches/releases of particular features and/or bug fixes (which includes non-application store data). As noted above, in at least one embodiment of the invention, individual applications provide an option to provide user reviews and feedback. Further, in at least one embodiment of the invention, (f3)=$w_4$*(the number of reviews generated by the given user near (in time) to any release), wherein $w_4$ is a weight and wherein the nearness criteria can be defined by a predetermined threshold.

The informative scorer component 206 generates an output of an informativeness score (f4) for a given user. Informative quality of reviews is commonly more useful as feedback for dark launches than mere sentiment or emotion-based reviews. By way of example, a review comprising the statement "This is great" demonstrates sentiment but does not provide useful and/or technical feedback. On the other hand, a review comprising the statement "The app crashes when Bluetooth® is turned off" is informative and therefore potentially useful as feedback. As such, the informative scorer component 206 generates the informativeness score (f4) for a given user by implementing a metric that is based on analysis of review text. In at least one embodiment of the invention, (f4)=$w_5$*(the number of informative lines in reviews generated by the given user), wherein $w_5$ represents the weight applied to the noted variable. Further, in one or more embodiments of the invention, a binary classifier (distinguishing informative from not informative) can be trained and used to classify each sentence in each review.

The UFA scorer component 214 generates an output of a user-feature alignment score (f5) for a given user and the given feature. Because development of new features is often in response to user feedback, users who have reviewed and/or complained about a particular feature are commonly likely to provide future and/or additional feedback about the feature. Accordingly, the UFA scorer component 214 generates the user-feature alignment score (f5) by implementing a metric that is based on (i) the type of feature being launched (which includes non-application store data, such as detailed herein), and (ii) one or more keywords in the reviews generated by the given user. In at least one embodiment of the invention, (f5)=$w_6$*(relevance(user, feature)), wherein the relevance score can be calculated based on previous reviews of the user and the feature to be released, and wherein $w_6$ represents the weight applied to the noted relevance score variable.

Referring back to FIG. 2, the above-detailed outputs generated by the loyalty scorer 204, the informative scorer 206, the timeliness scorer 208, the frequency scorer 210 and the UFA scorer 214 are provided to a log-linear model 216 to generate an overall score for the given user with respect to a given feature. In one or more embodiments of the invention, such a score can be calculated as follows: score (user, feature)=exp (c+$\Sigma_i w_i$ f(i)), wherein c and $w_i$ are the parameters of the model that can be learnt from historical data pertaining to previous feature launches or releases. As detailed herein, a log-linear model can be generated and/or implemented to calculate the overall score. It should also be noted and appreciated by one skilled in the art, however, that one or more embodiments of the invention can generate and/or implement one or more additional and/or alternative models to calculate the overall score. For example, at least one embodiment of the invention includes computing a weighted average of individual scores of each respective one of multiple features.

A collection of users can subsequently be ranked based on their respective overall score, and a predetermined number (the top-k users/scores) can be selected to participate in a given dark launch (via the connection between the user scoring module 104 and the user devices 106, as depicted in FIG. 1). Additionally, the overall score calculation can be refined over time and additional information about additional launches/releases becomes available.

Figure 3:
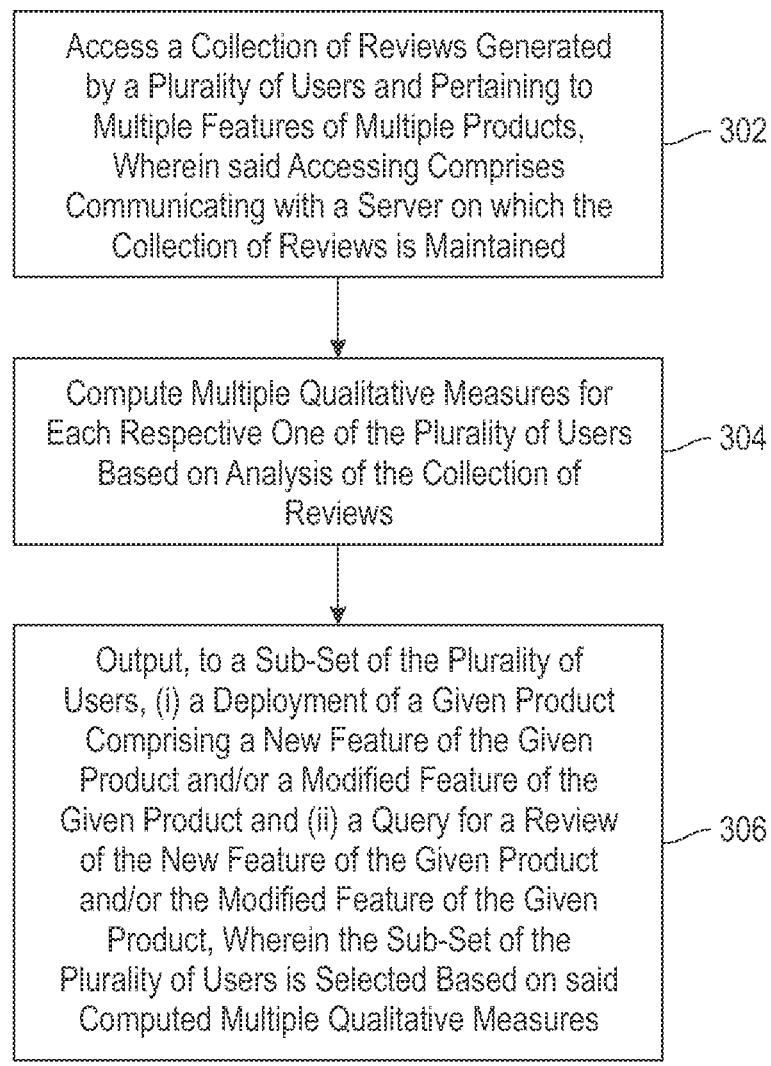
FIG. 3 is a flow diagram illustrating techniques according to an embodiment of the invention.

FIG. 3 is a flow diagram illustrating techniques according to an embodiment of the present invention. Step 302 includes accessing a collection of reviews generated by a plurality of users and pertaining to multiple features of multiple products, wherein said accessing comprises communicating with a server on which the collection of reviews is maintained. Step 304 includes computing multiple qualitative measures for each respective one of the plurality of users based on analysis of the collection of reviews, wherein said computing is carried out by a user scoring module executing on a hardware processor that is communicatively linked to (i) the server and (ii) a plurality of devices operated by the users.

Step 306 includes outputting, to a sub-set of the plurality of users, (i) a deployment of a given product comprising a new feature of the given product and/or a modified feature of the given product and (ii) a query for a review of the new feature of the given product and/or the modified feature of the given product, wherein the sub-set of the plurality of users is selected based on said computed multiple qualitative measures, and wherein said outputting is carried out by the user scoring module communicating to a sub-set of the plurality of devices that correspond to the sub-set of the plurality of users.

In at least one embodiment of the invention, (i) each respective one of the multiple products and (ii) the given product comprise software applications. In such an embodiment, the collection of reviews is maintained on an application store on the server.

Additionally, the multiple qualitative measures can include at least a loyalty score that measures a likelihood that a given user would continue using the given product when faced with an inconvenience. Computing the loyalty score includes implementing a metric that is based on (i) a length of time for which the given user has used the given product and (ii) one or more fluctuations in reviews provided by the given user for one or more other products. Also, at least one embodiment of the invention includes applying a respective weight to each of (i) the length of time for which the given user has used the given product and (ii) the one or more fluctuations in reviews provided by the given user for one or more other products.

The multiple qualitative measures can also include at least a frequency score that measures an amount of time that a given user spends using one or more given products and/or an amount of reviews generated by the given user. Computing the frequency score includes implementing a metric that is based on (i) a count of reviews generated by the given user, and (ii) a temporal stamp associated with each respective one of the reviews generated by the given user. Also, at least one embodiment of the invention includes applying a respective weight to each of (i) the count of reviews generated by the given user, and (ii) the temporal stamp associated with each respective one of the reviews generated by the given user.

Further, the multiple qualitative measures can include at least a timeliness score that measures an amount of time taken by a given user to generate one or more reviews. Computing the timeliness score includes implementing a metric that is based on (i) a temporal stamp associated with each respective one of multiple reviews generated by a given user, and (ii) a temporal stamp associated with each respective one of multiple deployments of one or more products. At least one embodiment of the invention can also include applying a respective weight to (i) each temporal stamp associated with each respective one of multiple reviews generated by a given user, and (ii) each temporal stamp associated with each respective one of multiple deployments of one or more products.

Additionally, the multiple qualitative measures can include at least an informativeness score that measures a level of informative content in one or more reviews generated by a given user. Computing the informativeness score includes implementing a metric that is based on an amount of technical content in one or more reviews generated by a given user.

Further, the multiple qualitative measures can include at least a user-feature alignment score that measures a level of compatibility between a given user and the new feature of the given product and/or the modified feature of the given product. Computing the user-feature alignment score comprises implementing a metric that is based on (i) an identified type of product deployed in each respective one of multiple product deployments and (ii) one or more keywords in one or more reviews generated by the given user. Additionally, at least one embodiment of the invention can include applying a respective weight to (i) each identified type of product deployed in each respective one of multiple product deployments and (ii) each of the one or more keywords in one or more reviews generated by the given user.

Also, an additional embodiment of the invention includes accessing a collection of reviews generated by a plurality of users and pertaining to multiple features of multiple products, wherein said accessing comprises communicating with a server on which the collection of reviews is maintained; computing multiple qualitative measures for each respective one of the plurality of users based on analysis of the collection of reviews, wherein said computing is carried out by a user scoring module executing on a hardware processor that is communicatively linked to (i) the server and (ii) a plurality of devices operated by the users; and combining the multiple qualitative measures to generate an overall score for each respective one of the plurality of users, wherein said computing is carried out by the user scoring module executing on the hardware processor. Such an embodiment also includes ranking the plurality of users on a basis of the overall score for each respective one of the plurality of users, wherein said ranking is carried out by the user scoring module executing on the hardware processor; and outputting, to a predetermined number of the plurality of users based on said ranking, (i) a deployment of a given product comprising a new feature of the given product and/or a modified feature of the given product and (ii) a query for a review of the new feature of the given product and/or the modified feature of the given product, wherein said outputting is carried out by the user scoring module communicating to a predetermined number of the plurality of devices that correspond to the predetermined number of the plurality of users.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 4:
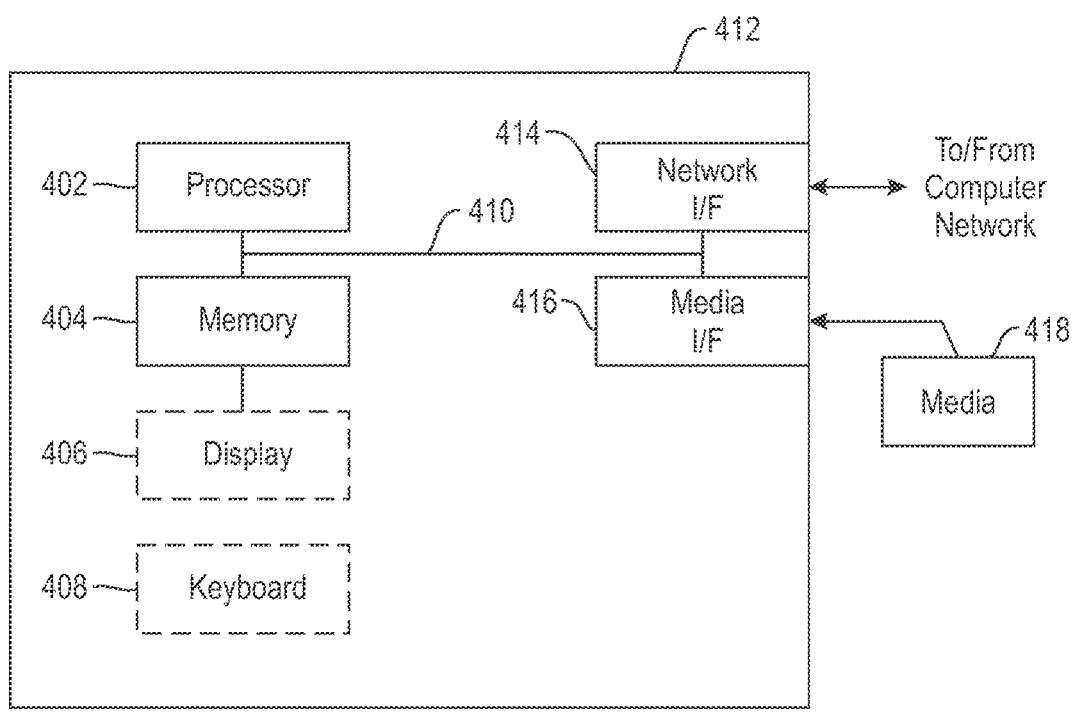
FIG. 4 is a system diagram of an exemplary computer system on which at least one embodiment of the invention can be implemented.

Additionally, an aspect of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one aspect of the present invention may provide a beneficial effect such as, for example, identifying potential users for a dark launch of a given feature by analyzing application reviews and ranking users based on reviews with respect to loyalty, informative content, quick and frequent feedback, feature-specific reviews and review history.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

accessing a collection of reviews generated by a plurality of users and pertaining to multiple features of multiple products, wherein said accessing comprises communicating with a server on which the collection of reviews is maintained;

computing multiple qualitative measures for each respective one of the plurality of users based on analysis of the collection of reviews, wherein said computing is carried out by a user scoring module executing on a hardware processor that is communicatively linked to (i) the server and (ii) a plurality of devices operated by the users, and wherein said computing comprises:

implementing a metric that is based on (i) the length of time for which a given user has used a given product and (ii) one or more fluctuations in reviews provided by the given user for one or more other products; and applying a respective weight to each of (i) the length of time for which the given user has used the given product and (ii) the one or more fluctuations in reviews provided by the given user for the one or more other products; and outputting, to a sub-set of the plurality of users, (i) a deployment of the given product comprising a new feature of the given product and/or a modified feature of the given product and (ii) a query for a review of the new feature of the given product and/or the modified feature of the given product, wherein the sub-set of the plurality of users is selected based on said computed multiple qualitative measures, and wherein said outputting is carried out by the user scoring module communicating to a sub-set of the plurality of devices that correspond to the sub-set of the plurality of users.

2. The method of claim 1, wherein (i) each respective one of the multiple products and (ii) the given product comprise software applications.

3. The method of claim 2, wherein the collection of reviews is maintained on an application store on the server.

4. The method of claim 1, wherein the multiple qualitative measures comprise at least a loyalty score that measures the likelihood that the given user would continue using the given product when faced with an inconvenience.

5. The method of claim 1, wherein the multiple qualitative measures comprise at least a frequency score that measures the amount of time that the given user spends using one or more given products and/or the amount of reviews generated by the given user.

6. The method of claim 5, wherein computing the frequency score comprises implementing a metric that is based on (i) a count of reviews generated by the given user, and (ii) a temporal stamp associated with each respective one of the reviews generated by the given user.

7. The method of claim 6, comprising:
applying a respective weight to each of (i) the count of reviews generated by the given user, and (ii) the temporal stamp associated with each respective one of the reviews generated by the given user.

8. The method of claim 1, wherein the multiple qualitative measures comprise at least a timeliness score that measures the amount of time taken by the given user to generate one or more reviews.

9. The method of claim 8, wherein computing the timeliness score comprises implementing a metric that is based on (i) a temporal stamp associated with each respective one of multiple reviews generated by the given user, and (ii) a temporal stamp associated with each respective one of multiple deployments of one or more products.

10. The method of claim 9, comprising:
applying a respective weight to each of (i) the temporal stamp associated with each respective one of multiple reviews generated by the given user, and (ii) the temporal stamp associated with each respective one of multiple deployments of one or more products.

11. The method of claim 1, wherein the multiple qualitative measures comprise at least an informativeness score that measures a level of informative content in one or more reviews generated by the given user.

12. The method of claim 11, wherein computing the informativeness score comprises implementing a metric that is based on the amount of technical content in one or more reviews generated by the given user.

13. The method of claim 1, wherein the multiple qualitative measures comprise at least a user-feature alignment score that measures a level of compatibility between the given user and the new feature of the given product and/or the modified feature of the given product.

14. The method of claim 13, wherein computing the user-feature alignment score comprises implementing a metric that is based on (i) an identified type of product deployed in each respective one of multiple product deployments and (ii) one or more keywords in one or more reviews generated by the given user.

15. The method of claim 14, comprising:
applying a respective weight to each of (i) the identified type of product deployed in each respective one of multiple product deployments and (ii) the one or more keywords in one or more reviews generated by the given user.

16. A computer program product, the computer program product comprising a computer readable storage medium having program instructions embodied therewith, the program instructions executable by a computing device to cause the computing device to:
access a collection of reviews generated by a plurality of users and pertaining to multiple features of multiple products, wherein said accessing comprises communicating with a server on which the collection of reviews is maintained;
compute multiple qualitative measures for each respective one of the plurality of users based on analysis of the collection of reviews, wherein said computing is carried out by a user scoring module executing on a hardware processor that is communicatively linked to (i) the server and (ii) a plurality of devices operated by the users, and wherein said computing comprises:
implementing at least one metric that is based on (i) the length of time for which a given user has used a given product and (ii) one or more fluctuations in reviews provided by the given user for one or more other products; and
applying a respective weight to each of (i) the length of time for which the given user has used the given product and (ii) the one or more fluctuations in reviews provided by the given user for the one or more other products; and
output, to a sub-set of the plurality of users, (i) a deployment of the given product comprising a new feature of the given product and/or a modified feature of the given product and (ii) a query for a review of the new feature of the given product and/or the modified feature of the given product, wherein the sub-set of the plurality of users is selected based on said computed multiple qualitative measures, and wherein said outputting is carried out by the user scoring module communicating to a sub-set of the plurality of devices that correspond to the sub-set of the plurality of users.

17. A system comprising:
a memory; and
at least one processor coupled to the memory and configured for:
accessing a collection of reviews generated by a plurality of users and pertaining to multiple features of multiple products, wherein said accessing comprises communicating with a server on which the collection of reviews is maintained;
computing multiple qualitative measures for each respective one of the plurality of users based on analysis of the collection of reviews, wherein said computing is carried out by a user scoring module executing on the at least one processor that is communicatively linked to (i) the server and (ii) a plurality of devices operated by the users, and wherein said computing comprises:
implementing a metric that is based on (i) the length of time for which a given user has used a given product and (ii) one or more fluctuations in reviews provided by the given user for one or more other products; and
applying a respective weight to each of (i) the length of time for which the given user has used the given product and (ii) the one or more fluctuations in reviews provided by the given user for the one or more other products; and
outputting, to a sub-set of the plurality of users, (i) a deployment of the given product comprising a new feature of the given product and/or a modified feature of the given product and (ii) a query for a review of the new feature of the given product and/or the modified feature of the given product, wherein the sub-set of the plurality of users is selected based on said computed multiple qualitative measures, and wherein said outputting is carried out by the user scoring module communicating to a sub-set of the plurality of devices that correspond to the sub-set of the plurality of users.

18. A method, comprising:

accessing a collection of reviews generated by a plurality of users and pertaining to multiple features of multiple products, wherein said accessing comprises communicating with a server on which the collection of reviews is maintained;

computing multiple qualitative measures for each respective one of the plurality of users based on analysis of the collection of reviews, wherein said computing is carried out by a user scoring module executing on a hardware processor that is communicatively linked to (i) the server and (ii) a plurality of devices operated by the users, and wherein said computing comprises:

implementing a metric that is based on (i) the length of time for which a given user has used a given product and (ii) one or more fluctuations in reviews provided by the given user for one or more other products; and applying a respective weight to each of (i) the length of time for which the given user has used the given product and (ii) the one or more fluctuations in reviews provided by the given user for the one or more other products;

combining the multiple qualitative measures to generate an overall score for each respective one of the plurality of users, wherein said computing is carried out by the user scoring module executing on the hardware processor;

ranking the plurality of users on the basis of the overall score for each respective one of the plurality of users, wherein said ranking is carried out by the user scoring module executing on the hardware processor; and outputting, to a predetermined number of the plurality of users based on said ranking, (i) a deployment of the given product comprising a new feature of the given product and/or a modified feature of the given product and (ii) a query for a review of the new feature of the given product and/or the modified feature of the given product, wherein said outputting is carried out by the user scoring module communicating to a predetermined number of the plurality of devices that correspond to the predetermined number of the plurality of users.

* * * * *